United States Patent [19]

Argumedo et al.

[11] 4,298,899
[45] Nov. 3, 1981

[54] MAGNETIC HEAD ASSEMBLY WITH FERRITE CORE

[75] Inventors: Armando J. Argumedo, Tucson, Ariz.; George W. Brock, Los Altos Hills, Calif.; Paul D. Losee, Tucson, Ariz.

[73] Assignee: International Business Machines Corporation, Armonk, N.Y.

[21] Appl. No.: 103,968

[22] Filed: Dec. 17, 1979

[51] Int. Cl.³ .................... G11B 5/22; G11B 5/42
[52] U.S. Cl. .................... 360/122; 360/103; 29/603
[58] Field of Search .................... 360/103, 122; 29/603

[56] References Cited

U.S. PATENT DOCUMENTS

| | | | |
|---|---|---|---|
| 3,126,615 | 3/1964 | Duinker | 360/120 |
| 3,479,738 | 11/1969 | Hanak | 360/120 |
| 3,544,982 | 12/1970 | Hanak | 360/120 |
| 3,610,837 | 10/1971 | Brede et al. | 360/103 |
| 3,735,052 | 5/1973 | Hodgendoorn et al. | 360/122 |
| 4,219,853 | 8/1980 | Albert et al. | 360/103 |

Primary Examiner—Robert S. Tupper
Attorney, Agent, or Firm—Nathan N. Kallman

[57] ABSTRACT

A magnetic head assembly includes a ferrite core sandwiched between two ceramic layers. Alumina films are deposited by sputtering on the sides of the ferrite core and on the ceramic layers in one structure, and on the ferrite core only in another structure, which are then bonded to form an integral head assembly. Slots to provide flying height control are formed in the air bearing surface of the ceramic layers. The process of making the assembly includes the steps of sputter etching the ferrite and ceramic prior to the deposition of the alumina.

6 Claims, 4 Drawing Figures

MAGNETIC HEAD ASSEMBLY WITH FERRITE CORE

DESCRIPTION

Technical Field

This invention relates to a novel magnetic head assembly formed with a ferrite core and to the process of making such assembly.

An object of this invention is to provide a magnetic ferrite head assembly which has longer wear life and is less subject to core erosion and deterioration.

Background Art

Magnetic head assemblies which incorporate ferrite cores are widely used in data processing systems. Ferrite is known to be brittle and therefore, during machining and shaping, ferrite edges and corners are chipped away and eroded. As the ferrite cores are made smaller and narrower to increase data track density, the chipping and erosion problem exponentially increases. Throughput and usage life decrease, thereby adding significantly to costs of production and maintenance.

Ferrite cores have been assembled with ceramic supports or glass layers to add structural strength. However, the problem of edge erosion, particularly with very narrow core structures, still persists.

Brief Description of the Drawings

The invention will be described in greater detail with reference to the drawings in which.

Disclosure of the Invention

Figure 1:
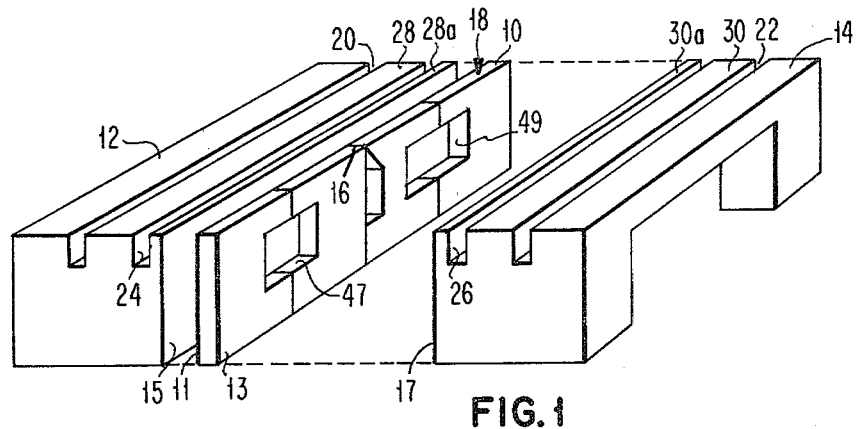
FIG. 1 is an exploded view of the magnetic head slider assembly made in accordance with this invention.

With reference to FIG. 1, a magnetic head slider assembly includes a ferrite core 10, which is sandwiched between two configured ceramic slabs 12 and 14. The ferrite core has a transducing gap 16 located at one end which is formed with an air bearing surface 18. The ceramic slabs 12 and 14, which may be formed from barium titanate, by way of example, each have respectively slotted portions 20, 22, 24 and 26 formed at the air bearing surface 18. The slotted portions bound respective rails 28, 28a and 30, 30a to provide a configuration that affords relatively close flying height of the head slider assembly and the transducing gap relative to a moving magnetic medium.

In accordance with this invention, the ferrite core 10 has alumina films 11 and 13 sputter deposited on each side and the ceramic slabs 12 and 14 have alumina films 15 and 17 sputter deposited on the side which is to be joined with the ferrite core to form a sandwich configuration. The alumina films, which are very hard, provide the necessary support to the brittle ferrite material of the core 10, so that chipping and erosion do not occur during operation of the head slider assembly with relation to the moving magnetic medium, which may be a magnetic tape, for example.

To manufacture a magnetic head slider assembly, in accordance with this invention, two blocks of ferrite are joined by glass bonding and sliced to thicknesses of between 10 to 15 mils. The sliced sections are ground and lapped into ferrite core structures having thicknesses of about 5 mils.

The sides of each ferrite core are sputter etched, or alternatively ion milled, to clean and remove the stresses induced in the ferrite material by machining. The removal is nonmechanical, so as not to introduce additional stresses in the ferrite grain material.

Figure 2:
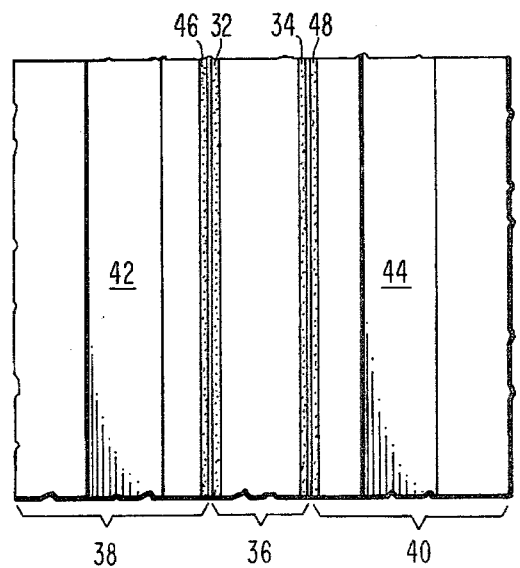
FIG. 2 is a side view, partly broken away, illustrating the layers of material used in the slider assembly.

After cleaning and sputter etching, films of alumina 32 and 34 (see FIG. 2) are sputter deposited on the sides of the ferrite core 36. The thicknesses of these layers may be in the range of 50 to 200 micro-inches, by way of example. The sputter depositing of the alumina films 32 and 34 is carried out under deposition conditions which promote low residual stress in the films and they provide a protective structural support adjacent to the ferrite core 36.

Thereafter, supporting side structures 38,40 of barium titanate are prepared. The barium titanate structures, after being configured by mechanical machining to form slots 42, 44, are ground and lapped on one side, and then sputter etched to remove stresses in the machined material and to clean the surfaces of the structures. Films of alumina 46, 48 are then deposited respectively on one side of each of the two barium titanate structures. The alumina films 32, 46 and 34, 48 are then bonded with a low temperature glass by diffusion or with an epoxy, thereby joining the ceramic side structures and the ferrite core to form a sandwich type configuration. The top surface of the sandwich assembly is then lapped to provide a desired air bearing contoured surface, which may be spherical or cylindrical.

After forming the sandwich type head assembly, an electrical coil is wound about the head through the apertures 47,49 in the ferrite core, in a well-known manner.

Figure 3:
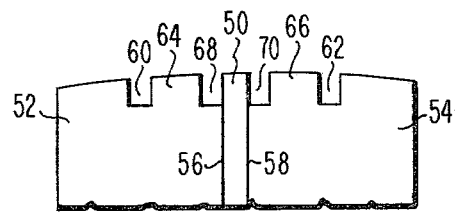
FIG. 3 is a representational end view of an alternative configuration of the air bearing surface.
Figure 4:
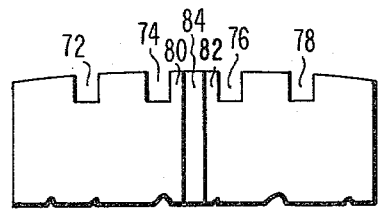
FIG. 4 is a representational end view delineating the air bearing surface of the slider assembly.

FIGS. 3 and 4 depict partial end views of different air bearing surface configurations, which may be used with the invention. In FIG. 3, the centered ferrite core 50 is encompassed by a ceramic support 52 on one side and a similar ceramic support 54 on the other side. The ceramic supports are joined to the ferrite core at the alumina films 56, 58 which are bonded as described heretofore. The ceramic structures have slots 60, 62 and rails 64, 66 and stepped portions 68, 70 along the air bearing surface.

In FIG. 4, the ceramic structures have slotted portions 72, 74, 76, 78 along the air bearing surface with supporting sections 80, 82 adjacent to the ferrite core 84, as opposed to the free edges of the core shown in FIG. 3. The physical differences in the configurations cause a difference in the flying heights of the head slider assemblies. It should be understood that the air bearing surface may have various numbers and arrangements of slots and rails to achieve the desired air bearing pressure distribution and to achieve the desired flying height.

What is claimed is:

1. A magnetic head assembly including a ferrite core having two sides and a transducing gap between said sides, wherein the improvement comprises:
   first and second ceramic structures disposed respectively on each side of said core;
   first and second alumina films disposed on each side of and in contact with said core;
   third and fourth alumina films deposited respectively on one side of and in contact respectively with said ceramic structures; and means for bonding said first and third alumina films and said second and fourth alumina films to form a sandwich structure around said ferrite core.

2. A magnetic head assembly as in claim 1, wherein said alumina films are sputter deposited on said ferrite core and on said ceramic structures.

3. A magnetic head assembly as in claim 1, wherein said bonding means comprises a glass or epoxy.

4. A magnetic head assembly as in claim 1, wherein said ceramic structures are formed from barium titanate.

5. A magnetic head assembly as in claim 1, wherein said sandwich configuration has a contoured air bearing surface.

6. A magnetic head assembly as in claim 5, wherein said air bearing surface comprises slotted portions in said ceramic structures.

* * * * *